United States Patent [19]

Sturman

[11] Patent Number: 5,718,264
[45] Date of Patent: Feb. 17, 1998

[54] HIGH SPEED 3-WAY CONTROL VALVE

[75] Inventor: Oded E. Sturman, Woodland Park, Colo.

[73] Assignee: Sturman Industries, Woodland Park, Colo.

[21] Appl. No.: 660,879

[22] Filed: Jun. 10, 1996

[51] Int. Cl.$^6$ .................. F15B 13/044; F16K 31/08
[52] U.S. Cl. ............ 137/625.65; 251/65; 251/129.07; 251/129.14; 251/129.16; 335/234
[58] Field of Search .............. 137/625.65; 251/65, 251/129.07, 129.14, 129.16; 335/234

[56] References Cited

U.S. PATENT DOCUMENTS

| | | | |
|---|---|---|---|
| 3,305,209 | 2/1967 | Bender et al. | 251/129.1 |
| 3,396,751 | 8/1968 | Bender | 137/625.65 |
| 3,458,769 | 7/1969 | Stampfli | 251/65 X |
| 3,661,183 | 5/1972 | Komaroff et al. | 137/625.65 |
| 4,403,765 | 9/1983 | Fisher | 137/125.65 X |
| 5,584,466 | 12/1996 | Furkno et al. | 251/65 |

*Primary Examiner*—Gerald A. Michalsky
*Attorney, Agent, or Firm*—Blakely Sokoloff Taylor & Zafman

[57] ABSTRACT

A control valve the controls the flow of a fluid. The valve has a housing with an inlet port, a cylinder port and a reservoir port. The inlet port is typically connected to a source of pressurized fluid. The cylinder port is connected to an actuator chamber and the reservoir port is connected to a fluid reservoir. The control valve has a solenoid that moves an internal valve between a first position and a second position. When the internal valve is in the first position, fluid can flow from the inlet port through the cylinder port. When the valve is in the second position, the inlet port is closed and the cylinder port is in fluid communication with the reservoir port. The housing has an internal channel that allows the supply fluid to apply a pressure on both sides of the internal valve. The fluid forces on the internal valve are opposite and offsetting, such that the solenoid force required to move the internal valve is independent of the pressure of the fluid. When the solenoid is energized, the internal valve is moved from the first position to the second position. The solenoid contains a magnet that holds the armature and internal valve in the second position.

6 Claims, 4 Drawing Sheets

HIGH SPEED 3-WAY CONTROL VALVE

BACKGROUND OF THE INVENTION

1. Field of the Invention

The present invention relates to control valves that direct the flow of a fluid.

2. Description of Related Art

Hydraulic systems typically have control valves to control the flow of fluid to an actuator. Linear actuators have pistons that move in a forward or rearward direction. The piston has a piston head that separates and defines two actuator chambers. The chambers are connected to the control valves and a pump that supplies pressurized fluid to the actuator. The piston can be moved in opposite directions by switching the control valves into one of two positions. The control valves are adapted to allow pressurized fluid to flow into one of the actuator chambers, while the other chamber is in fluid communication with a reservoir. When one chamber is pressurized, the fluid in the other chamber is allowed to flow into the reservoir, such that the piston moves in a predetermined direction. The valves are also capable of switching the flow of fluid so that the piston moves in the opposite direction.

Some hydraulic systems require an electrical interface for control of the actuators. For example, many aircraft now have "fly by wire" controls, which incorporate a computer to aid in the flight of the plane. The computer provides power to the valves to direct the flow of fluid accordingly. The valves typically contain a solenoid, that when energized directs the flow of fluid into one of the actuator chambers, and when deenergized pressurizes the other actuator chamber. Thus when the computer provides power to the control valve the piston moves in one direction, and when power is terminated the piston moves in the opposite direction. Present control valves require a continuous application of power to keep the solenoids energized and the actuator piston extended in one direction. When multiple valves are used, the computer needs a significant power supply to continuously energize the solenoids. Such a power supply increases the cost and complexity of the computer and adds undesirable weight to the aircraft. It would therefore be desirable to provide a control valve that would switch and remain in a different position without continuously requiring electrical power.

Some actuators have large output loads, which require very high fluid pressures within the actuator chambers. For example, if the actuators are moving the control surfaces of a high performance aircraft, internal actuator pressures up to 3000 psi are not uncommon. Such pressures must be redirected by the control valves. Control valves typically have a piston or valve that is moved by the solenoid between two positions, thereby directing the fluid into one of the actuator chambers. To move the valve, the solenoid usually must overcome the pressure of the fluid. At pressures of 3000 psi, this force can be considerable, such that the solenoid requires a significant amount of electrical power. This large power requirement again increases the weight, cost and complexity of the power supply. Additionally, overcoming the inertia of the high pressure fluid decreases the speed and reaction time of the valve. It would therefore be desirable to have a control valve that operates independently of the fluid pressure within the hydraulic system.

SUMMARY OF THE INVENTION

The present invention is a control valve the controls the flow of a fluid. The valve has a housing with an inlet port, a cylinder port and a reservoir port. The inlet port is typically connected to a source of pressurized fluid. The cylinder port is connected to an actuator chamber and the reservoir port is connected to a fluid reservoir. The control valve has a solenoid that moves an internal valve between a first position and a second position. When the internal valve is in the first position, fluid can flow from the inlet port through the cylinder port. When the valve is in the second position, the inlet port is closed and the cylinder port is in fluid communication with the reservoir port. The housing has an internal channel that allows the supply fluid to apply a pressure on both sides of the internal valve. The fluid forces on the internal valve are opposite and offsetting, such that the solenoid force required to move the internal valve is independent of the pressure of the fluid. The present valve arrangement provides a high speed valve that can operate in a high pressure environment.

The control valve is connected to a power supply that can energize the solenoid. The solenoid has an armature connected to the internal valve to move the same. When the solenoid is energized, the internal valve is moved from the first position to the second position. The solenoid contains a magnet that becomes magnetized when power is supplied to the control valve. The force of the magnet holds the armature and internal valve in the second position. The control valve thereby only requires power for a small time interval to move the internal valve from the first position to the second position. There is no need to continuously apply power to the solenoid to maintain the valve in the second position. To move the valve back to the first position, a voltage is again supplied to the solenoid. The voltage has a polarity opposite to the voltage used to move the valve into the second position. The reverse polarity of the voltage reduces the charge in the magnet which releases the armature. The internal valve is then pushed back into the first position by return springs.

The valve can be connected to a computer that provides a series of intelligent signals to the solenoid to control the flow of fluid through the valve. When the valve is connected to an actuator, the processor can provide very precise and programmable control of the movement of the actuator. To decrease cost and increase reliability, the valve is couple to the armature by a piston. The piston compensates for tolerances in the assembly.

Therefore it is an object of the present invention to provide a control valve that can be switched and maintained in a second position without having to continuously supply power to the valve.

It is also an object of the present invention to provide a control valve that operate independently of the operating pressure of the system.

It is also an object of the present invention to provide a control valve that is reliable and inexpensive to produce.

BRIEF DESCRIPTION OF THE DRAWINGS

The objects and advantages of the present invention will become more readily apparent to those ordinarily skilled in the art after reviewing the following detailed description and accompanying drawings, wherein.

DETAILED DESCRIPTION OF THE INVENTION

Figure 1:
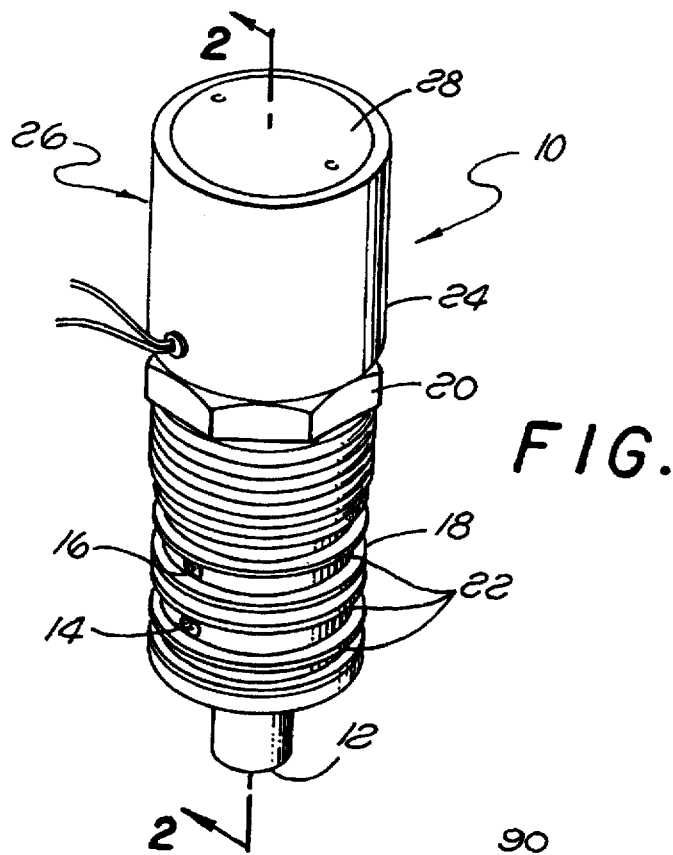
FIG. 1 is a perspective view of a control valve of the present invention.
Figure 2:
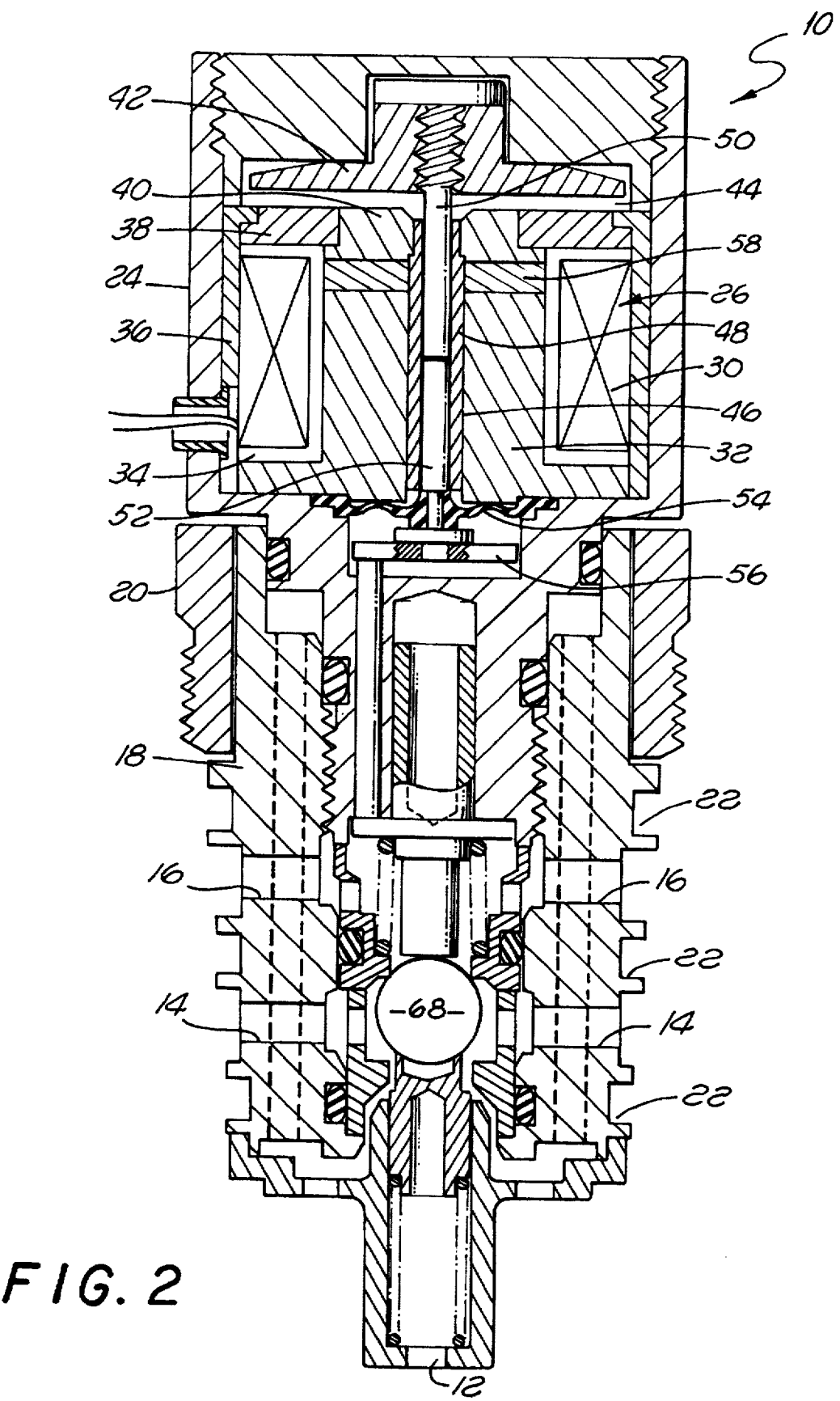
FIG. 2 is a cross-sectional view taken at line 2—2 of FIG. 1.

Referring to the drawings more particularly by reference numbers, FIG. 1 shows a control valve 10 of the present invention. The control valve 10 has an inlet port 12, a cylinder port 14 and reservoir port 16. As shown in FIG. 2, the control valve 10 preferably has a pair of cylinder ports 14 and a pair of reservoir ports 16. The cylinder and reservoir ports are drilled into a lower body housing 18. A nut 20 may be attached to the lower housing 18 to provide a means for screwing the valve into a threaded manifold (not shown). The lower housing 18 may also have three concentric external grooves 22 adapted to retain O-rings (not shown) that seal the valve 10 to the manifold.

The lower housing 18 is connected to an upper housing 24 that contains a solenoid assembly 26. The control valve 10 may also have a cover 28 that screws into the upper housing 24. The cover 28 can be removed for easy access to the solenoid assembly 26. The solenoid assembly 26 includes a coil 30 that extends around a magnetic core 32. The coil 30 is wrapped around a bobbin 34 as is known in the art. A magnetic outer pole 36 surrounds the coil 30 and has a portion in contact with the core 32, to provide an area for the magnetic flux to flow therethrough. The outer pole 36 is separated from a magnetic inner pole 38 by an annular spacer 40. The outer and inner poles are both magnetically coupled to an armature 42. A gap 44 normally exist between the poles and the armature 42. The area between the armature 42 and outer pole 36, and between the armature 42 and inner pole 40 are equal, so that there is not a restriction in the flow of magnetic flux. Likewise, the area between the core 32 and the inner pole 40, and the core 32 and the outer pole 36, are also equal to the armature/pole areas to prevent any restriction in flux flow.

The core 32 has a longitudinal bore 46 that has a bushing 48 pressed therein. The bushing 48 guides an armature pin 50 and a diaphragm pin 52, as the pins move relative to the core 32. The diaphragm pin 52 is connected to a diaphragm 54 that seals the solenoid assembly 26. The diaphragm pin 52 is also connected to a washer 56.

Figure 3:
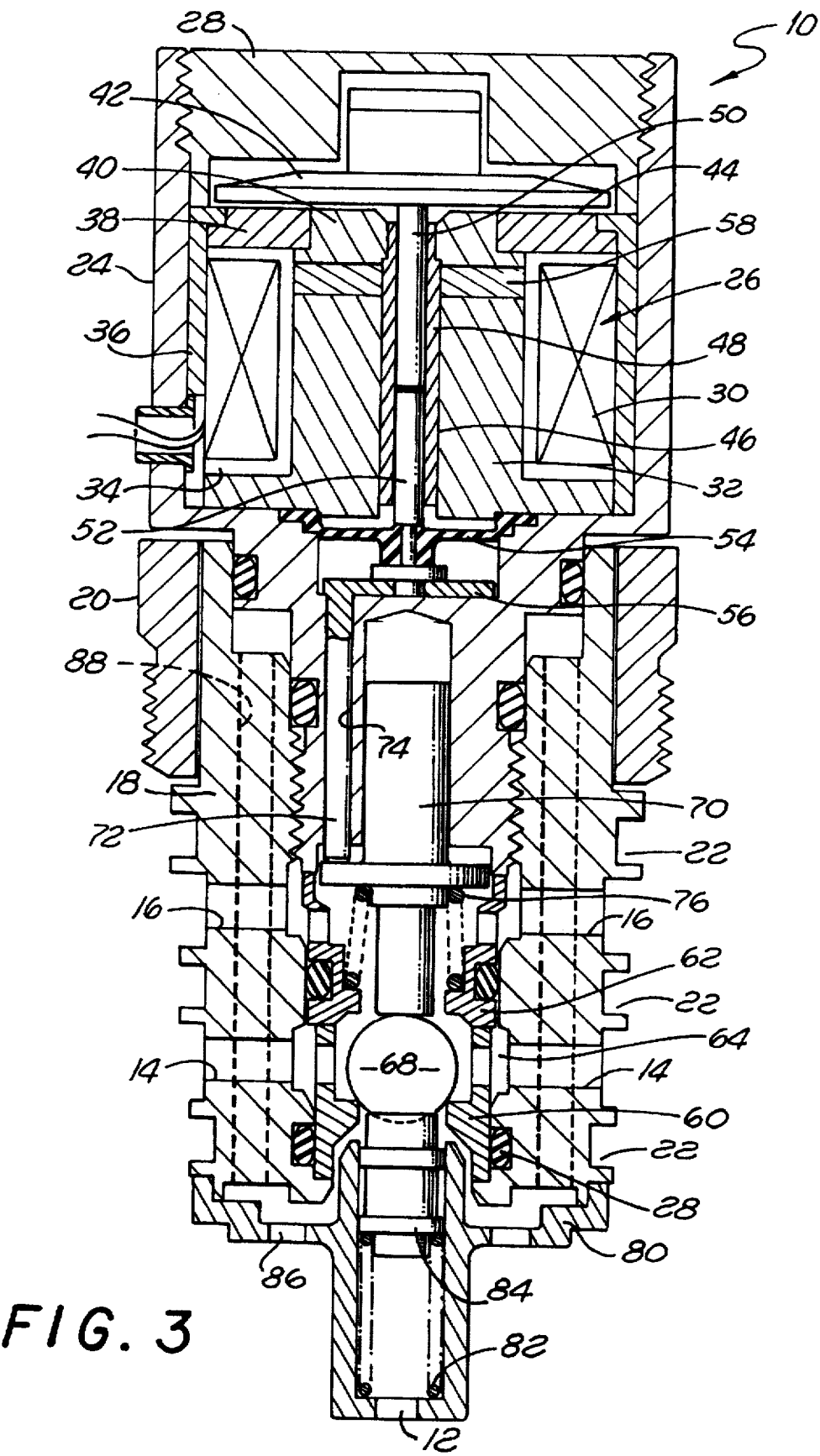
FIG. 3 is a cross-sectional view similar to FIG. 1 showing a solenoid energized and an internal valve moved from a first position to a second position.

The solenoid assembly 26 is connected to an external power source that supplies power to the coil 30. When a voltage is applied to the coil 30, a magnetic flux is induced in the magnetic core 32. As shown in FIG. 3, the flux flows through the armature and poles, and moves the armature 42 from a first position to a second position. The washer 56 seats against the upper housing 24 before the armature make contact with the poles or spacer. The washer 56 prevents excessive wear on the armature 42 which is typically constructed from a soft iron material.

Between the core 32 and the inner pole 40 is a magnet 58. The magnetic flux magnetizes the magnet 58 and creates a magnetic force which pulls the armature 42 toward the core 32. When power is terminated the magnet 58 maintains an attractive magnetic force that keeps the armature in the second position. In this manner, the solenoid 26 does not require a constant supply of power to maintain the armature 42 in the second position.

To release the armature 42 from the second position, a voltage having a reverse polarity is applied to the coil 30 The reverse polarity of the voltage induces a magnetic flux that flows in an opposite direction. The flux reduces the charge in the magnet 58 until the armature 42 is no longer held by the magnet 58.

The lower housing 18 contains a lower seat 60 and an upper seat 62. The lower seat 60 has a pair of cylinder port openings 64 that provide fluid communication to the cylinder ports 14. The upper seat 62 has a pair of reservoir port openings 66 that provide fluid communication to the reservoir ports 16. Between each seat is a ball valve 68 that can move between a first position and a second position. When in a first position, the valve 68 is seated against the upper seat 62 and the cylinder port 14 is in fluid communication with the inlet port 12. When the ball valve 68 is in the second position, the valve 68 is seated against the lower seat 60 and the cylinder port 14 is in fluid communication with the reservoir port 16.

The control valve 10 has a first piston 70 that is in constant contact with the ball valve 68. The piston 70 is coupled to the washer 56 by three pins 72 that extend through three channels 74 in the upper housing 24. When the armature 42 moves from the first position to the second position, the pins 72 move the piston 70 and ball valve 68 from the first position to the second position. Captured between the piston 70 and the upper seat 62 is a first spring 76 that biases the piston 70 and armature 42 into the first position. The control valve 10 may also have O-rings 78 located between the housings, and between the housings and seats to prevents fluid leakage therein.

Attached to the end of the lower housing 18 is a port plate 80. The plate 80 contains a second spring 82 captured by a second piston 84. The second spring 82 biases the ball valve 68 into the first position. The plate 80 may also have a pair of channel ports 86 that are connected to the same flow line as the inlet port 12, such that the pressure of the fluid at the channel ports 86 is the same as the pressure at the inlet port 12. The lower housing 18 has a pair of pressure channels 88 that provide fluid communication from the channel ports 86 to the first piston 70. The diameter of the first piston 70 and second 84 piston are the same, so that the pistons exert equal but opposite forces on the ball valve. The only force needed to move the ball valve from the first position to the second position is the energy required to overcome the inertia of the pins, piston and valve, and the force of the springs 76 and 82. There is no need to overcome the pressure of the fluid at the inlet port 12, whereby the valve operates independently of the fluid pressure of the system. The reduction in operating force also greatly reduces the power requirements of the solenoid.

Figure 4:
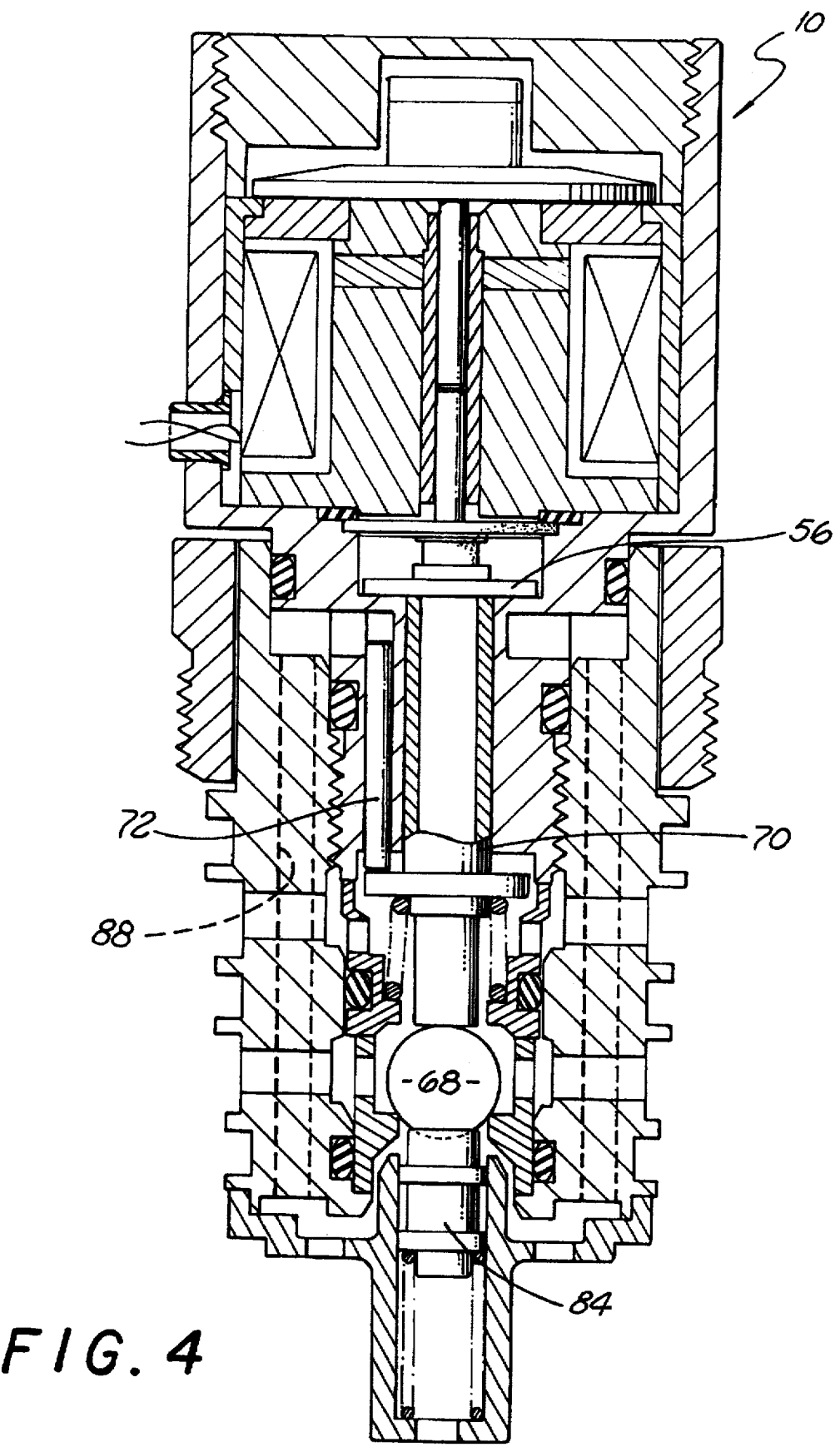
FIG. 4 is a cross-sectional view similar to FIG. 2, showing an alternate embodiment.

FIG. 4 shows an alternate embodiment, wherein the piston 70 is connected directly to the washer 56 and the pins 72 are in fluid communication with the channels 88. The combined areas of the pins 72 are equal to the area of the second piston 84, so that the fluid forces on the ball valve 68 are equal and offsetting.

In operation, the solenoid 26 is normally deenergized wherein the armature 42, piston 70 and ball valve 68 are in the first positions. Fluid is allowed to flow from the inlet port 12 to the cylinder port 14. As shown in FIG. 3, power is then supplied to the solenoid 26, energizing the coil 30 and moving the armature 42, piston 70 and ball valve 68 into the second position. The flow of fluid is redirected so that the cylinder port 14 is now in fluid communication with the reservoir port 16. When power is terminated, the magnet 58 maintains the armature 42 and ball valve 68 in the second position. To move the ball valve 68 back into the first position, a voltage of reverse polarity is applied to the solenoid 26. The voltage demagnetizes the magnet 58 and releases the armature 42, such that the first 76 and second springs 82 push the armature 42 and ball valve 68 back intothe first position.

Figure 5:
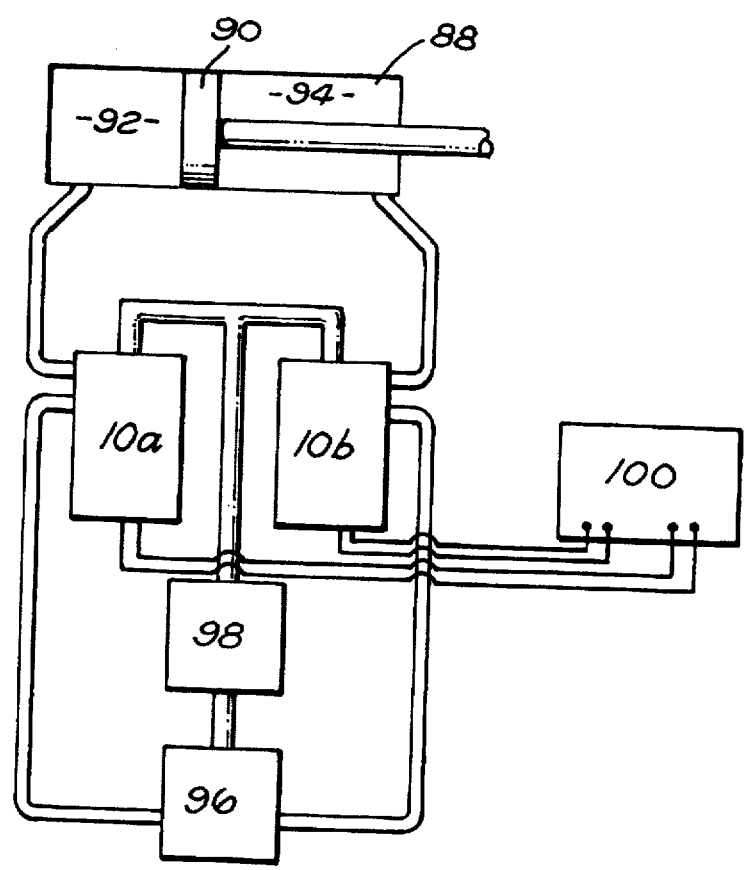
FIG. 5 is a schematic of the control valve of FIG. 1 in a hydraulic system.

As shown in FIG. 5, a pair of control valves 10a and 10b can be connected to an actuator 89. The actuator 89 has a piston 90 and a pair of actuator chambers 92 and 94. The cylinder port 14 of the control valve 10a is connected to chamber 92 and the cylinder port 14 of control valve 10b is connected to chamber 94. The reservoir ports 16 of both control valves are connected to a fluid reservoir 96. The reservoir is connected to a pump 98 that provides pressurized fluid to the inlet ports 12 of the control valves. The control valves are connected to a controller 100 that provides power to the solenoids. The controller 100 energizes/ deenergizes the valves 10a and 10b 180° out of phase, so that one valve provides fluid communication between the pump and one actuator chamber, and the other valve provides fluid communication between the reservoir and the other actuator chamber.

Energizing valve 10a provides fluid communication between the chamber 92 and the reservoir 96. The control valve 10b is deenergized, such that the second chamber 94 is in fluid communication with the pump 98. The pressure within chamber 94 causes the piston 90 to move inward and forces the fluid within chamber 92 to flow through the valve 10a and into the reservoir 96. To reverse the direction of the actuator piston 90, valve 10b is energized and a voltage of reverse polarity is applied to the valve 10a. Chamber 94 is now in fluid communication with the reservoir 96, and chamber 92 is in fluid communication with the pump 98. The pressure in chamber 92 moves the piston in the outward direction. The low power requirements of the valves allows the controller 100 to provide a typical 2 volt digital signal to energize the solenoids. The controller 100 can provide a sequence of digital signals to open and close the valves. The controller 100 can either be preprogrammed, or subject to inputs from a user or another system.

While certain exemplary embodiments are described in detail and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A valve that directs the flow of a fluid that has a fluid pressure, comprising:

a housing having an inlet port, a cylinder port, a reservoir port and a channel coupled to said inlet port;

a valve within said housing that allows fluid communication between said cylinder port and said inlet port when in a first position and allows fluid communication between said reservoir port and said cylinder port when in a second position;

a first member and a second member in contact with said valve, said second member being opposite from said first member and adjacent to said inlet port, said housing is coupled to said inlet port such that the fluid pressure on said first member is essentially equal to a fluid pressure from said inlet port on said second member, said first and second members having areas such that the fluid forces on said valve are equal and offsetting; and, a solenoid operatively connected to said valve to move said valve between said first and second positions, said solenoid having a magnet to hold said valve in said second position.

2. The valve as recited in claim 1, wherein said solenoid moves said valve from said first position to said second position when a voltage with a first polarity is applied to said solenoid, said voltage magnetizes said magnet such that said magnet holds said valve in said second position, said solenoid moves said valve from said second position to said first position when a voltage with a second opposite polarity is applied to said solenoid.

3. The valve as recited in claim 2, wherein said voltages are direct current.

4. The valve as recited in claim 3, wherein said voltages are supplied by a computer.

5. A valve that directs the flow of a fluid that has a fluid pressure, comprising:

a housing having an inlet port, a cylinder port, a reservoir port and a channel coupled to said inlet port;

a valve within said housing and in fluid communication with said ports, said valve allows fluid communication between said cylinder port and said inlet port when in a first position and allows fluid communication between said reservoir port and said cylinder port when in a second position;

a piston in contact with said valve and coupled to said channel so that fluid forces on said valve are equal and offsetting;

a solenoid coupled to said piston to move said valve between said first and second positions;

a pin that couples to said piston to said solenoid;

a first spring that biases said piston to allow said valve to move into said first position; and a second spring coupled to said valve to bias said valve into said first position.

6. A valve that directs the flow of a fluid that has a fluid pressure, comprising:

a housing having an inlet port, a cylinder port, a reservoir port and a channel coupled to said inlet port;

a valve within said housing and in fluid communication with said ports, said valve allows fluid communication between said cylinder port and said inlet port when in a first position and allows fluid communication between said reservoir port and said cylinder port when in a second position;

a piston in contact with said valve;

a solenoid coupled to said piston to move said valve between said first and second positions;

a first pin that couples to said piston to said solenoid;

a second pin that is coupled to said channel and said piston so that fluid forces on said valve are equal and offsetting;

a first spring that biases said piston to allow said valve to move into said first position; and a second spring coupled to said valve to bias said valve into said first position.

* * * * *